United States Patent [19]

Senapati et al.

[11] Patent Number: 4,548,771
[45] Date of Patent: Oct. 22, 1985

[54] ULTRASONIC VULCANIZATION

[75] Inventors: Nagabhusan Senapati; Duryodhan Mangaraj, both of Dublin, Ohio

[73] Assignee: Battelle Memorial Institute, Columbus, Ohio

[21] Appl. No.: 574,829

[22] Filed: Jan. 30, 1984

[51] Int. Cl.⁴ .......................... B29H 5/01; B29H 5/26
[52] U.S. Cl. ..................................... 264/23; 156/73.1; 156/73.4; 156/73.5; 264/25; 264/26; 264/68; 264/71; 425/41; 425/174.2; 425/445
[58] Field of Search ...................... 264/23, 25, 26, 347, 264/70, 71, 22, 68, 236, DIG. 46; 425/174.2, 41, 445; 156/73.4, 73.1, 73.5

[56] References Cited

U.S. PATENT DOCUMENTS

| 2,626,430 | 1/1953 | Dawson | 264/23 |
| 3,058,513 | 10/1962 | Schaub et al. | 156/73.1 |
| 3,184,353 | 5/1965 | Balamuth et al. | 156/73.1 |
| 3,298,065 | 1/1967 | Pendleton | 264/23 |
| 3,717,427 | 2/1973 | Bodine | 264/23 |
| 3,773,872 | 11/1973 | Isshiki et al. | 264/25 |
| 3,904,457 | 9/1975 | Laughlin | 156/73.4 |
| 4,132,519 | 1/1979 | Reed | 425/174.2 |
| 4,315,875 | 2/1982 | Hoedt | 264/23 |
| 4,461,662 | 7/1984 | Onishi | 156/73.4 |

FOREIGN PATENT DOCUMENTS

| 492395 | 1/1976 | U.S.S.R. | 264/23 |
| 686891 | 9/1979 | U.S.S.R. | 264/22 |
| 910459 | 3/1982 | U.S.S.R. | 156/73.1 |

Primary Examiner—Jeffery Thurlow
Attorney, Agent, or Firm—Philip M. Dunson

[57] ABSTRACT

Methods and apparatus for vulcanizing rubber and like material (10). Ultrasonic energy at about 10 to 100 kilohertz is applied to the material (10) at an energy intensity sufficient to generate heat to a temperature in the range of about 200 to 300 degrees Fahrenheit, while a static pressure is applied on the material (10) sufficient to prevent substantial cavitation and material degradation. The application of the ultrasonic energy and the pressure is maintained for at least about 10 minutes for each ⅛ inch in thickness of the material (10).

21 Claims, 2 Drawing Figures

ULTRASONIC VULCANIZATION

FIELD

This invention relates to vulcanizing rubber and like material. It has to do more particularly with methods and apparatus wherein ultrasonic energy is applied to the material to generate heat therein and accelerate vulcanization while a static pressure is applied on the material sufficient to prevent substantial cavitation and material degradation therein.

BACKGROUND

Conventionally both natural and synthetic rubber are vulcanized in the presence of sulphur or peroxide at high temperature and pressure. This process has several significant shortcomings. Because of rubber's poor thermal conductivity, the process is slow and energy intensive. Typically several hours may be required to vulcanize thick sections of rubber at temperatures as high as 400° F. and pressures of 2000 psi. Poor bonding between non-polar conventionally vulcanized rubber and polar reinforcements, such as cords, fabrics, and metal, often leads to interfacial failure. The additives that are used to accelerate the curing process and the special surface treatments that are applied to improve the bonding characteristics add to the manufacturing cost. The additives often cause scorching of the rubber compound during the molding stage.

The present invention largely overcomes the disadvantages of the conventional process. Poor thermal conductivity of rubber, a major problem in conventional thermal curing, becomes an advantage in the present ultrasonic process. In the conventional process poor conductivity resists penetration of the heat which is applied from the outside. In the present process, however, the ultrasonically-produced heat is generated internally, and poor conductivity acts to retain this heat and keep it from escaping. The internal generation of the vulcanizing heat uniformly throughout the material also eliminates the undesirable scorching that occurs when the heat is applied from the outside. The present method of ultrasonic vulcanization tends to change the interfacial property of rubber and the reinforcing materials to improve bonding. Improved wetting and flow characteristics produced by ultrasonic vulcanization have the potential to increase the interfacial bond strength between the rubber and currently used reinforcing materials.

We have successfully vulcanized specimens of natural and synthetic rubber with the application of ultrasonic energy at a significantly shorter time and lower total energy consumption and with a minimum of additives compared to the conventional thermal process. The production of many experimental samples has demonstrated the technique to be both reliable and repeatable.

The present invention provides several technical and economic benefits such as more than 100 percent increase in production rate due to shorter cure time; better than 50 percent energy savings; potential for uniform cure especially for thick sections; potential for improved bonding qualities resulting in better mechanical and aging properties of the final product; reduced raw material costs resulting from reduction or elimination of costly additives such as accelerators, activators, and coupling agents; lower mold temperature, eliminating the possibility of scorching in the mold; accelerated degassing; and potential for significant overall cost savings from all of the above benefits.

DISCLOSURE

A typical method according to the present invention for vulcanizing rubber and like material comprises applying ultrasonic energy to the material at an energy intensity sufficient to generate heat in the material to a temperature in the range of about 200 to 300 degrees Fahrenheit, applying a static pressure on the material sufficient to prevent substantial cavitation and material degradation therein, and maintaining the application of the ultrasonic energy and the pressure for at least about 10 minutes for each $\frac{1}{8}$ inch in thickness of the material. Typically the frequency of the ultrasonic energy is in the range of about 10 to 100 kilohertz, and the energy intensity is in the range of about 20 to 200 watts per square inch.

Preferably the energy is applied initially at a higher energy intensity and is decreased asymptotically to a lower energy intensity. Typically the higher energy intensity is about 100 to 200 watts per square inch, the lower energy intensity is about 20 to 80 watts per square inch, and the energy intensity is decreased to about 40 to 45 percent of its intensity in about 3 to 5 minutes. Typically the pressure is in the range of about 500 to 1000 pounds per square inch, and the time of maintaining the application of the energy and the pressure is about 10 to 60 minutes.

Typical apparatus according to the present invention for vulcanizing rubber and like material comprises means for applying and maintaining ultrasonic energy to the material at an energy intensity sufficient to generate heat in the material to a temperature in the range of about 200 to 300 degrees Fahrenheit, and means for applying and maintaining a static pressure on the material sufficient to prevent substantial cavitation and material degradation therein. Typically the frequency of the ultrasonic energy is in the range of about 10 to 100 kilohertz, and the energy intensity is in the range of about 20 to 200 watts per square inch.

Preferably the energy applying and maintaining means comprises means for applying the ultrasonic energy initially at a higher energy intensity and means for decreasing it asymptotically to a lower energy intensity. Typically the higher energy intensity is about 100 to 200 watts per square inch, the lower energy intensity is about 20 to 80 watts per square inch, and the energy intensity decreasing means comprises means for decreasing the energy intensity to about 40 to 45 percent of its initial intensity in about 3 to 10 minutes.

Typically the pressure is in the range of about 500 to 1000 pounds per square inch, and the time of maintaining the application of the energy and the pressure is about 10 to 60 minutes.

Typical means for applying and maintaining the ultrasonic energy comprises an ultrasonic transducer, a booster horn energized by the transducer, and a coupling horn energized by the booster horn and contacting a surface of the material. The apparatus typically includes a mold for holding the material, and the means for applying and maintaining the static pressure typically comprises an adjustable spring or a hydraulic cylinder that presses against the mold. Typically the mold comprises essentially a material that is mechanically strong, low in thermal conductivity, and low in absorptance of ultrasonic energy, such as steel, titanium, or ceramic.

DRAWINGS

CARRYING OUT THE INVENTION

Figure 1:
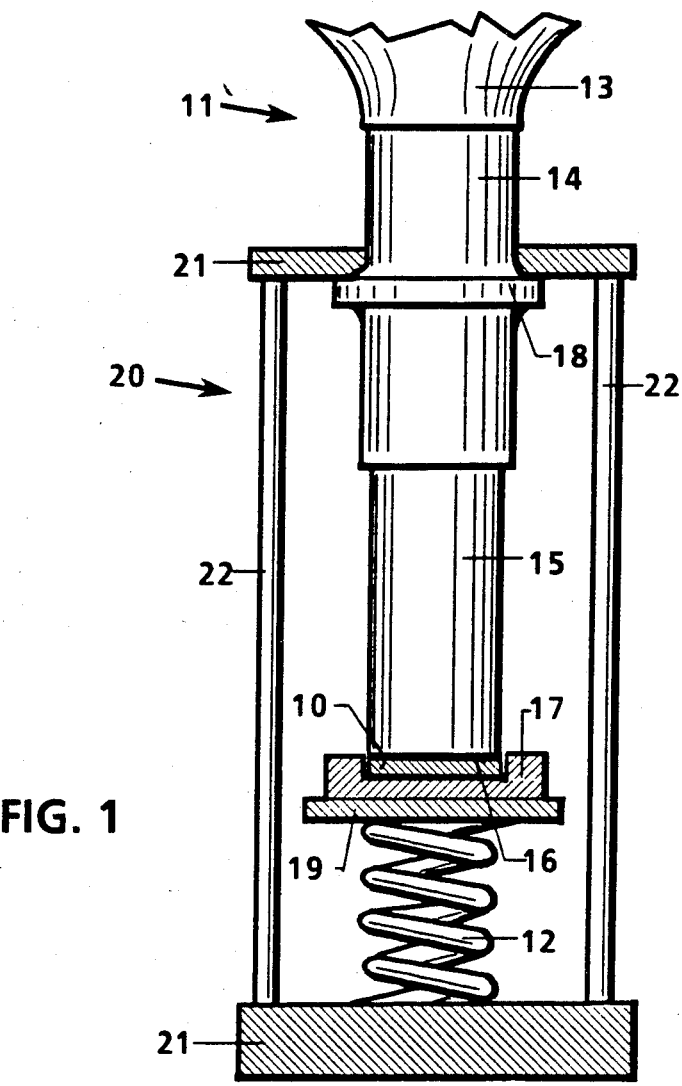
FIG. 1 is a front view, partly sectional and partly schematic, of typical apparatus according to the present invention.

Typical apparatus according to the present invention for vulcanizing rubber and like material 10 comprises means 11 for applying and maintaining ultrasonic energy to the material 10 at an energy intensity sufficient to generate heat in the material to a temperature in the range of about 200 to 300 degrees Fahrenheit, and means 12 for applying and maintaining a static pressure on the material 10 sufficient to prevent substantial cavitation and material degradation therein. Typically the frequency of the ultrasonic energy is in the range of about 10 to 100 kilohertz, and the energy intensity is in the range of about 20 to 200 watts per square inch.

Typical means 11 for applying and maintaining the ultrasonic energy comprises an ultrasonic transducer 13, a booster horn 14 energized by the transducer 13, and a coupling horn 15 energized by the booster horn 14 and contacting a surface 16 of the material 10. The apparatus typically includes a mold 17 for holding the material 10, and the means 12 for applying and maintaining the static pressure typically comprises an adjustable spring 12 or a conventional hydraulic cylinder (not shown) that presses against the mold 17. Typically the mold 17 comprises essentially a material that is mechanically strong, low in thermal conductivity, and low in absorptance of ultrasonic energy, such as steel, titanium, or ceramic.

Figure 2:
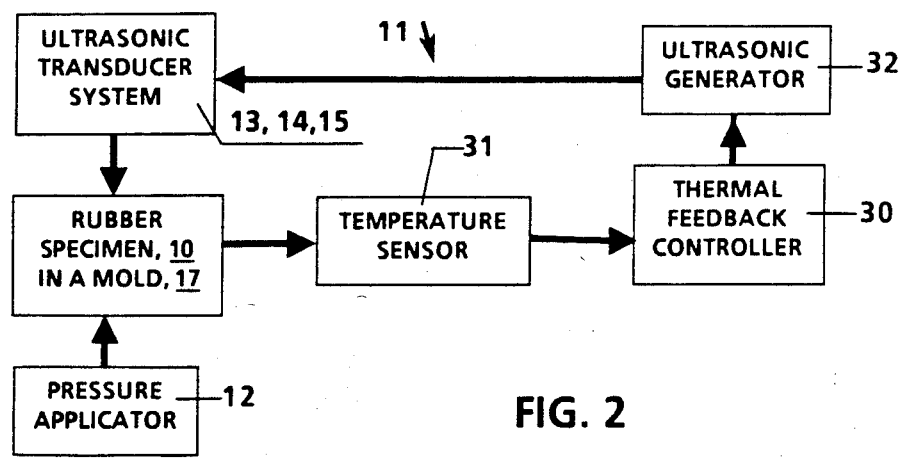
FIG. 2 is a block diagram showing the apparatus of FIG. 1 and associated controlling means.

As is illustrated in FIG. 2, the energy applying and maintaining means 11 preferably comprises means, such as thermal feedback control means 30, for applying the ultrasonic energy intially at a higher energy intensity and for decreasing it asymptotically to a lower energy intensity. Typically, the higher energy intensity is about 100 to 200 watts per square inch, the lower energy intensity is about 20 to 80 watts per square inch, and the energy intensity decreasing means (included in the control means 30) comprises means for decreasing the energy intensity to about 40 to 45 percent of its initial intensity in about 3 to 5 minutes. The control means 30 typically comprises a thermal feedback controller 30, as in FIG. 2, that is responsive to the temperature in the material 10 via a temperature sensor 31, and that continuously controls the intensity of the energy furnished by an ultrasonic generator 32 to the transducer system 13,14,15.

Typically the pressure is in the range of about 500 to 1000 pounds per square inch, and the time of maintaining the application of the energy and the pressure is about 10 to 60 minutes.

A typical method according to the present invention for vulcanizing rubber and like material 10 comprises applying ultrasonic energy to the material 10 at an energy intensity sufficient to generate heat in the material to a temperature in the range of about 200 to 300 degrees Fahrenheit, applying a static pressure on the material 10 sufficient to prevent substantial cavitation and material degradation therein, and maintaining the application of the ultrasonic energy and the pressure for at least about 10 minutes for each ⅛ inch in thickness of the material. Typically the frequency of the ultrasonic energy is in the range of about 10 to 100 kilohertz, and the energy intensity is in the range of about 20 to 200 watts per square inch.

Preferably the energy is applied initially at a higher energy intensity and is decreased asymptotically to a lower energy intensity. Typically the higher energy intensity is about 100 to 200 watts per square inch, the lower energy intensity is about 20 to 80 watts per square inch, and the energy intensity is decreased to about 40 to 45 percent of its initial intensity in about 3 to 5 minutes.

Typically the pressure is in the range of about 500 to 1000 pounds per square inch, and the time of maintaining the application of the energy and the pressure is about 10 to 60 minutes.

EXAMPLES

Natural rubber (NR), styrene-butadiene rubber (SBR) and silicone rubber were selected as the representative base polymers. Five formulations were prepared to evaluate the effects of resin type, carbon black, and accelerator on the ultrasonic and thermal vulcanization process. The compositions of these five formulations are given in Table 1. Three other commercial compounds, including two silicone rubbers and one tire retread compound, were also evaluated. We do not know the compositions of these commercial compounds.

TABLE 1

FORMULATION DETAILS OF RUBBER COMPOUNDS

| INGREDIENTS | Weight in grams Formulation Numbers | | | | |
|---|---|---|---|---|---|
| | I | II | III | IV | V |
| Rubber (SBR) | 300.0 | — | — | — | — |
| Rubber (Natural) | — | 300.0 | 300.0 | 300.0 | 300.0 |
| Zinc Oxide | 9.0 | 18.0 | 15.0 | 15.0 | 15.0 |
| Sulphur | 5.2 | 10.5 | 6.7 | 8.2 | 8.2 |
| Stearic Acid | 3.0 | 1.5 | 6.0 | 6.0 | 6.0 |
| Carbon Black (Oil Black N330) | 150.0 | — | 105.0 | — | — |
| Mercapto Benzothiazole (CAPTAX) | — | 1.5 | — | 3.0 | — |
| N—Tert-Butyl Benzo Thiazole-2-Sulphenamide (TBBS) | 3.0 | — | 2.1 | — | — |
| N—Oxy-Diethylene Benzothiazol-2-Sulphennamide | — | — | — | — | 3.0 |

Specimens from the same batch or formulation were used for both thermal and ultrasonic vulcanization experiments. The thermal vulcanization was conducted in ASTM standard molds, electrically heated to 250 degrees Fahrenheit (or such temperature as desired) for 10,20,40, or 80 minutes.

Specimens from the same batch were also cured ultrasonically to provide a valid comparison with the control specimens of thermally cured rubber. The design of the ultrasonic vulcanization experiments, the experimental procedure and the results are briefly described below.

FIG. 1 illustrates the ultrasonic vulcanization apparatus used in the experiments. The essential components are an ultrasonic transducer 13 coupled to a booster horn 14 with a nodal flange 18 which in turn is coupled to a cylindrical waveguide (horn) 15 vibrating in longitudinal resonance. A cup shaped mold 17 accommodates flat disc type rubber specimens 1.68 inches in diameter and 0.25 inch thick. An adjustable helical coil spring 12 applies a known force on a movable base 19 which supports the mold 17. The components are mounted in a rigid support frame 20 comprising upper and lower horizontal support members 21 and three adjustable vertical tie rods 22 (two of which are visible in FIG. 1).

The spring force is manually adjustable so that the hydrostatic pressure on the rubber can be in the range of 0 to 800 psi.

Major differences and advantages of the present method of applying ultrasonic energy to vulcanize rubber compared to Dawson's U.S. Pat. No. 2,626,430 and Issiki's U.S. Pat. No. 3,773,872 are: (a) The efficiency of the transfer of ultrasonic energy into rubber is significantly better in the present method because of the direct coupling as compared to coupling via a secondary fluid. (b) The ultrasonic energy is applied under high static pressure in the range of 800 psi which improves the efficiency of coupling the energy to the rubber. (c) Ultrasonic cavitation in the specimen is totally suppressed by hydrostatic pressure above the cavitation threshold. This approach eliminates undesirable decomposition due to cavitation, thus providing moldings with improved mechanical properties. (d) Lower frequency ultrasonic energy at 20 kHz is used in the present method as compared to higher frequencies of 400 kHz. This provides two major advantages: First, there is more than an order of magnitude increase in penetration depth at 20 kHz compared to 400 kHz. Therefore, the present method is more practical and commercially attractive than others. Second, the efficiency of generating ultrasonic energy at 20 kHz is significantly higher than that at 400 kHz, resulting in lower energy requirements.

Since heat is generated internally due to internal absorption of ultrasonic energy in the rubber, the mold material should be a good thermal insulator. The mold should also have adequate strength to withstand the hydrostatic pressure of 500 to 800 psi and superimposed cyclic stresses due to the ultrasonic waves.

Four readily available, low cost, easily moldable or machinable plasters, ceramics, and metals were selected for the molds. The machined and heat treated ceramic mold was the best of the molds used. Thick 0.15 inch discs of rubber could be successfully vulcanized ultrasonically in 10 minutes with 200 watts of ultrasonic power using a ceramic mold. However, the initial molds failed after 1 or 2 experiments. Considerable effort was spent to prestress the mold and structurally support the mold with metallic frames. However the life of these ceramic molds could not be increased to more than 3 or 4 experimental moldings.

For parametric studies to evaluate the process variables, we used metal molds of nominal rolled mild steel, stainless steel and also titanium. The titanium mold worked the best, due to the better thermal insulating properties. However, structural ceramic molds are likely to be more cost effective and energy efficient in the long run.

A disc shaped uncured rubber sample 10 was introduced into the mold cavity. Then the mold 17 was manually placed under the ultrasonic horn 15 and the spring force was adjusted to provide a pressure of about 500 psi on the surface 16 of the specimen 10. Ultrasonic power was turned on for the desired time (in the range of 10 to 30 minutes). The temperature of the mold 17 close to the specimen 10 was monitored during these experiments. The power level was manually adjusted to between 100 and 200 watts so that the temperature did not exceed a preset value, e.g. 250 degrees Fahrenheit.

The thermally and ultrasonically cured rubber samples were tested for tensile strength and percent elongation. The results of these experiments are shown in Table 2.

TABLE 2

PROPERTIES OF ULTRASONICALLY AND THERMALLY VULCANIZED RUBBER FORMULATION V (Ref. Table 1)

| Type of Cure | Time of Cure, (minutes) | Thickness, (mils) | Tensile Strength, (psi) | Average tensile strength (psi) |
|---|---|---|---|---|
| Thermal | 10 | 34 | DID NOT CURE | |
| | 40 | 34 | 539 | |
| | | 35 | 492 | 570 |
| | | 34 | 580 | |
| | 80 | 39 | 524 | 524 |
| | | 40 | 511 | |
| | | 41 | 538 | |
| Ultrasonic | 10 | 82 | 489 | |
| | | 83 | 520 | 505 |
| | 20 | 88 | 697 | |
| | | 89 | 456 | 597 |

Our experimental observation as stated in Table 2 confirmed that comparable cure levels and tensile strength could be achieved by our ultrasonic technique at less than half the cure time at the same temperature even though the thermally cured specimens were much thinner. There was also no evidence of any degradation of the material cured ultrasonically as evident by comparably high tensile strength.

For comparison of the cure time and energy requirement for samples of the same thickness; 0.25 inch thick specimens of both the formulations IV and V were ultrasonically cured. Specimens from the same batch were also cured thermally to 0.25 inch thick sheets. Formulation IV is a scorchy (fast cure) compound and the formulation V is a slow cure compound. The optimum cure time was estimated by measuring the compression set following ASTM standard D 395-78. The energy consumed was estimated from the power used and the duration of actual application of energy. The cure time, the energy used and the compression set values are given in Table 3.

TABLE 3

COMPARISON OF ULTRASONIC AND THERMAL VULCANIZATION

| PROPERTY | FORMULATION | THERMAL | ULTRASONIC |
|---|---|---|---|
| Cure Temperature (°F.) | All | 250 | 250 |
| Cure Time (Minutes) | IV | 40–60 | 20–30 |
| | V | 60–120 | 30–60 |
| Energy Used (K watt Hr) | IV | 0.3–0.5 | 0.03–0.10 |
| | V | 0.5–1.0 | 0.1–0.2 |
| Compression Set (%) | IV | 12–30 | 12–29 |
| | V | 20–25 | 18–21 |

The present ultrasonic process is expected to provide significant production efficiencies and energy savings. While ceramic molds were significantly better than the metal mold, it was still possible to ultrasonically cure rubber samples of almost three times the thickness in half the time as was required for thermally cured, thinner samples.

The pressure necessary for ultrasonic cure is about 500 psi, which is about half that necessary for thermal cure.

In ultrasonic curing, heat is generated in the rubber itself whereas in conventional steam curing, the heat is transferred from the press to the mold and the material. Therefore the ultrasonic method is far more energy efficient and more easily avoids scorching.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of vulcanizing rubber and like material comprising
    applying ultrasonic energy to the material at an energy intensity sufficient to generate heat in the material to a temperature in the range of about 200 to 300 degrees Fahrenheit,
    applying a static pressure on the material sufficient to prevent substantial cavitation and material degradation therein, and
    maintaining the application of the ultrasonic energy and the pressure for at least about 10 minutes for each ⅛ inch in thickness of the material.

2. A method as in claim 1, wherein the frequency of the ultrasonic energy is in the range of about 10 to 100 kilohertz.

3. A method as in claim 1, wherein the energy intensity is in the range of about 20 to 200 watts per square inch.

4. A method as in claim 1, wherein the energy is applied initially at a higher energy intensity and is decreased asymptotically to a lower energy intensity.

5. A method as in claim 4, wherein the higher energy intensity is about 100 to 200 watts per square inch and the lower energy intensity is about 20 to 80 watts per square inch.

6. A method as in claim 4, wherein the energy intensity is decreased to about 40 to 45 percent of its initial intensity in about 3 to 5 minutes.

7. A method as in claim 1, wherein the pressure is in the range of about 500 to 1000 pounds per square inch.

8. A method as in claim 1, wherein the time of maintaining the application of the energy and the pressure is about 10 to 60 minutes.

9. Apparatus for vulcanizing rubber and like material comprising
    means for applying and maintaining ultrasonic energy to the material at an energy intensity sufficient to generate heat in the material to a temperature in the range of about 200 to 300 degrees Fahrenheit, and
    means for applying and maintaining a static pressure on the material sufficient to prevent substantial cavitation and material degradation therein.

10. Apparatus as in claim 9, wherein the frequency of the ultrasonic energy is in the range of about 10 to 100 kilohertz.

11. Apparatus as in claim 9, wherein the energy intensity is in the range of about 20 to 200 watts per square inch.

12. Apparatus as in claim 9, wherein the energy applying and maintaining means comprises means for applying the ultrasonic energy initially at a higher energy intensity and means for decreasing it asymptotically to a lower energy intensity.

13. Apparatus as in claim 12, wherein the higher energy intensity is about 100 to 200 watts per square inch and the lower energy intensity is about 20 to 80 watts per square inch.

14. Apparatus as in claim 12, wherein the energy intensity decreasing means comprises means for decreasing the energy intensity to about 40 to 45 percent of its initial intensity in about 3 to 5 minutes.

15. Apparatus as in claim 9, wherein the pressure is in the range of about 500 to 1000 pounds per square inch.

16. Apparatus as in claim 9, wherein the time of maintaining the application of the energy and the pressure is about 10 to 60 minutes.

17. Apparatus as in claim 9, wherein the means for applying and maintaining the ultrasonic energy comprises an ultrasonic transducer,
    a booster horn energized by the transducer, and
    a coupling horn energized by the booster horn and contacting a surface of the material.

18. Apparatus as in claim 9, including a mold for holding the material.

19. Apparatus as in claim 18, wherein the means for applying and maintaining the static pressure comprises an adjustable spring or a hydraulic cylinder that presses against the mold.

20. Apparatus as in claim 18, wherein the mold comprises essentially a material that is mechanically strong, low in thermal conductivity, and low in absorptance of ultrasonic energy.

21. Apparatus as in claim 18, wherein the mold comprises essentially steel, titanium, or a ceramic.

* * * * *